US010073874B1

(12) United States Patent
Sivathanu et al.

(10) Patent No.: US 10,073,874 B1
(45) Date of Patent: Sep. 11, 2018

(54) UPDATING INVERTED INDICES

(71) Applicant: GOOGLE INC., Mountain View, CA (US)

(72) Inventors: Muthian Sivathanu, Bangalore (IN); Saurabh Goyal, Bangalore (IN); Rajiv Mathews, Bangalore (IN)

(73) Assignee: GOOGLE LLC, Mountain View, CA (US)

( * ) Notice: Subject to any disclaimer, the term of this patent is extended or adjusted under 35 U.S.C. 154(b) by 1276 days.

(21) Appl. No.: 14/086,536

(22) Filed: Nov. 21, 2013

Related U.S. Application Data

(60) Provisional application No. 61/827,959, filed on May 28, 2013.

(51) Int. Cl.
G06F 7/00 (2006.01)
G06F 17/00 (2006.01)
G06F 17/30 (2006.01)
G06F 11/14 (2006.01)

(52) U.S. Cl.
CPC .... G06F 17/30321 (2013.01); G06F 11/1412 (2013.01)

(58) Field of Classification Search
CPC ............... G06F 17/30321; G06F 17/30011
USPC ................................. 707/649, 769
See application file for complete search history.

(56) References Cited

U.S. PATENT DOCUMENTS

| 6,349,308 | B1 | 2/2002 | Whang et al. | |
| 7,395,274 | B2 * | 7/2008 | Moir ....................... | G06F 9/524 |
| 9,003,162 | B2 * | 4/2015 | Lomet ..................... | G06F 12/10 707/999.2 |
| 2004/0225963 | A1 * | 11/2004 | Agarwal ............... | G06F 17/218 715/255 |
| 2005/0004898 | A1 * | 1/2005 | Bluhm .............. | G06F 17/30864 |
| 2008/0033964 | A1 * | 2/2008 | Richards ............. | G06F 11/2046 |
| 2008/0263086 | A1 * | 10/2008 | Klemba ................. | G06Q 10/08 |
| 2011/0173177 | A1 * | 7/2011 | Junqueira ......... | G06F 17/30864 707/709 |
| 2014/0032593 | A1 * | 1/2014 | Libenzi ............. | G06F 17/30011 707/769 |
| 2014/0032595 | A1 * | 1/2014 | Makkar ............. | G06F 17/30557 707/770 |

* cited by examiner

Primary Examiner — James K Trujillo
Assistant Examiner — John J Morris
(74) Attorney, Agent, or Firm — Brake Hughes Bellermann LLP

(57) ABSTRACT

Implementations provide an indexing system with an instant failover that uses a moving snapshot window. For example, a method may include receiving, by a processor, a query and determining that a main query processing engine is not responding. The method may further include generating a search result for the query using a secondary query processing engine that applies at least one snapshot record to a portion of a posting list, the snapshot record including the portion of the posting list as it appeared before a modification, and the modification occurring within a predetermined time before receiving the query. The portion is a fixed size smaller than the posting list. Applying the snapshot record can include overlaying the portion of the posting list with the snapshot record beginning at an offset specified by the snapshot record. The main query processing engine generates a search result without applying snapshot records.

26 Claims, 10 Drawing Sheets

152

T₁: <"cat": 1, 2, 3, 4,　7, 9, 12, 15,　17, 19, 24, 27,　30, 32, 35, 37, ...>

T₂: <"cat": 1, 2, 3, 5,　7, 9, 12, 15,　17, 20, 24, 27,　30, 32, 33, 35, ...>

T₃: <"cat": 1, 2, 3, 6,　7, 9, 13, 15,　17, 20, 24, 27,　30, 32, 33, 35, ...>

T₄: <"cat": 0, 2, 3, 6,　7, 9, 13, 15,　17, 20, 23, 27,　30, 32, 33, 35, ...>
　　　　　　　420　　　　422　　　　　424　　　　　426

154

T₂: <"cat":　　0: 1, 2, 3, 4>　　450
T₂: <"cat": 256: 17, 19, 24, 27>　451
T₂: <"cat": 384: 30, 32, 35, 37>　452

T₃: <"cat":　　0: 1, 2, 3, 5>　　460
T₃: <"cat": 128: 7, 9, 12, 15>　461

T₄: <"cat":　　0: 1, 2, 3, 6>　　470
T₄: <"cat": 256: 17, 20, 24, 27>　471

FIG. 4

UPDATING INVERTED INDICES

RELATED APPLICATIONS

This application claims priority under 35 U.S.C. § 119 to Provisional Patent Application Ser. No. 61/827,959, entitled "UPDATING INVERTED INDICES" filed on May 28, 2013. The subject matter of this earlier filed application is hereby incorporated by reference.

BACKGROUND

A document search system may index millions of documents associated with a corpus. The index for the search system may be an inverted index that may include posting lists. Some posting lists may represent a term and documents that contain the term. Other posting lists may represent a property and documents that have the property. The search system may also include other information, such as metadata for the posting lists and documents and/or parsed and encoded document content. In a distributed environment, the index may be divided among various machines by document, by term, or both. Every day the documents of the corpus may change, and often a document, such as a news organization's home page or a blog, may change several times a day. Some search systems may apply updates to documents in a near-instant manner to keep the index as fresh as possible. However, some of these updates may include bad data that can cause the search system to crash. But in a system that supports instant or near-instant updates, there may not be time to test for such bad data in an update. This may lead to index unavailability.

SUMMARY

Implementations provide an indexing system with an instant failover that uses a moving snapshot window. The indexing system may have a main process and a secondary process that share access to the index and document data. The indexing system may also include snapshot data that can be used to generate the moving snapshot window. The main process may serve queries from the index, always using the current copy of the index. The secondary process may be capable of serving queries from an older version of the index by using the snapshot data, should the main process become unavailable. The older version may be only a couple of minutes old, to maintain the freshness of search results. Furthermore, the secondary process may be capable of instantly serving queries without any initialization or loading delay. Because the secondary process may use the snapshot data to serve queries from the older version of the index, the secondary process avoids any recent updates that may have caused the main process to crash. The snapshot data can also be used to restore the main process. For example, snapshot data may be copied into the index, which has the effect of undoing the changes that caused the main process to crash. While this may mean some updates are lost, the main process can be brought back faster, improving the system availability. Some implementations may use a lock-free memory sharing structure for the snapshot records, or other data shared between two processes.

One aspect of the disclosure can be embodied in a system that includes memory storing an index of documents, the index including at least one posting list that maps a term to documents. The system can also include at least one processor and memory storing instructions that, when executed by the at least one processor cause the system to perform operations. The operations can include receiving an update for the posting list, generating a snapshot record, and modify the portion of the posting list using the update. The snapshot record can include a portion of the posting list that is to be changed by the update and the snapshot record can be smaller than the entire posting list.

The system can include one or more of the following features. For example, the operations may also include delaying the updating of the posting list for a predetermined amount of time. In some implementations, delaying includes placing the update in an update pending queue and modifying the portion of the posting list when the predetermined amount of time has elapsed. As another example, the portion of the posting list to be change may fit within a cache line of the processor, the snapshot record may use a lock-free memory sharing structure, and/or the snapshot record can include an associated timestamp. The lock-free memory sharing structure may include a state field that indicates whether the snapshot record is invalid, valid and pinned, or valid and not pinned. In some an implementations, the operations may also include using a main query processing engine to generate a search result for a query based on the updated posting list without applying the snapshot record and/or determining that the main query processing engine is unavailable and using a secondary query processing engine to generate a search result for a subsequent query by applying the snapshot record to the updated posting list. In some implementations, the secondary query processing engine may overlay the portion of the posting list with the snapshot record. The secondary query processing engine may overlay the portion of the posting list with the snapshot record when the timestamp of the snapshot record indicates the snapshot is an oldest snapshot record for the portion within a predetermined amount of time. In some implementations the operations may include restoring the main query processing engine by overlaying the portion of the posting list with the snapshot record.

In some implementations the update is a first update and the operations include receiving a second update for the posting list, the second update including a second update to the portion of the posting list, generating a second snapshot record, the second snapshot record including the modified portion that was modified by the first update; and updating the posting list with the second update. In some implementations, the update is a first update and the portion is a first portion and the operations include receiving a second update for the posting list, the second update including a change to a second portion of the posting list and a change to the first portion of the posting list, generating a second snapshot record, the second snapshot record including the modified portion that was modified by the first update, and generating a third snapshot record, the third snapshot record including the second portion of the posting list that is to be changed by the second update, wherein the second snapshot record and the third snapshot record have a same associated timestamp, and modifying the second portion of the posting list with the second update.

Another aspect of the disclosure can be embodied in a method that includes receiving, by a processor, a query, determining that a main query processing engine is not responding, and generating a search result for the query using a secondary query processing engine that applies at least one snapshot record to a portion of a posting list. The snapshot record includes the portion of the posting list as it appeared before a modification, the modification occurring within a predetermined time before receiving the query. The portion can be a fixed size smaller than the posting list. The predetermined time can represent a time elapsed in processing at least a predetermined number of queries. Applying the snapshot record can include overlaying the portion of the posting list with the snapshot record beginning at an offset specified by the snapshot record. In some implementations, the at least one snapshot record is an oldest snapshot record selected from a plurality of snapshot records for the portion of the posting list, the plurality of snapshot records having timestamps within the predetermined time.

The method can include one or more of the following features. For example, the method may also include replacing the portion of the posting list with the snapshot record beginning at an offset specified by the snapshot record to recover the posting list, and restarting the main query processing engine. As another example, the method may also include receiving an update for the posting list, determining a second portion of the posting list affected by the update, generating a new snapshot record for the second portion of the posting list, the new snapshot record including information in the second portion of the posting list, and modifying the second portion of the posting list with the update. In such implementations, the method may also include placing the update in an update pending queue and modifying the second portion of the posting list when a second predetermined amount of time has elapsed. As another example, the main query processing engine can generate search results without applying snapshot records and/or the snapshot record can include a lock-free memory sharing structure.

Another aspect of the disclosure can be embodied in a system that includes memory storing an index of documents, the index including at least one posting list that maps a term to documents and memory storing snapshot records. The snapshot records having at least one record that includes a map portion that includes a state field, and a data portion that includes a portion of the at least one posting list. The system can also include at least one processor; and memory storing instructions that, when executed by the at least one processor cause the system to receive a query that includes the term, determine that a main query processing engine is unavailable, and generate a search result for the query using a secondary query processing engine that overlays a portion of the at least one posting list with the data portion of the at least one snapshot record.

The system can include one or more of the following features. For example, the system can also further include memory storing instructions that, when executed by the at least one processor, cause the system to receive an update for the at least one posting list, determine a second portion of the posting list affected by the update, identify a second snapshot record with a state field that indicates the second snapshot record is invalid, and generate a new snapshot record for the second portion of the posting list. Generating the new snapshot record can include writing information from the second portion of the posting list to memory storing a data portion of the new snapshot record, setting the state field of the second snapshot record to a value indicating the second snapshot record is valid, and associating the map portion of the second snapshot record with the data portion of the new snapshot record. The system can include memory storing instructions that, when executed by the at least one processor, cause the system to modify the second portion of the at least one posting list using the update.

As another example, the state field can have a value less than zero to indicate the snapshot record is invalid, a value of zero to indicate that the snapshot record is valid, and a value greater than zero to indicate that the snapshot record is valid and in use by the secondary query processing engine. In another example, the data portion is of a fixed size and/or the state field is a timestamp field and when the timestamp field is within a predetermined window plus a buffer time the record is valid and when the timestamp field is outside the predetermined window plus the buffer time the record is invalid.

One or more of the implementations of the subject matter described herein can be implemented so as to realize one or more of the following advantages. As one example, the secondary process can be invoked without a restoration process or copying backup data, thus the search system may continue to serve queries without interruption. The secondary process that uses the snapshot records thus provides robustness and high availability in the face of corrupt updates. Other advantages include no overhead on query serving performance for the primary serving engine while providing instant failover in case of a crash of the primary serving engine. Furthermore, even with instant failover, there is little overhead on query serving performance when using the secondary serving engine. A lock-free memory sharing structure for data shared between processes can also increase system availability by offering decreased complexity during a recovery.

The details of one or more implementations are set forth in the accompanying drawings and the description below. Other features will be apparent from the description and drawings, and from the claims.

BRIEF DESCRIPTION OF DRAWINGS

FIG. 4 illustrates an example timeline for three updates to a posting list and the resulting snapshot records.

Like reference symbols in the various drawings indicate like elements.

DETAILED DESCRIPTION

Figure 1:
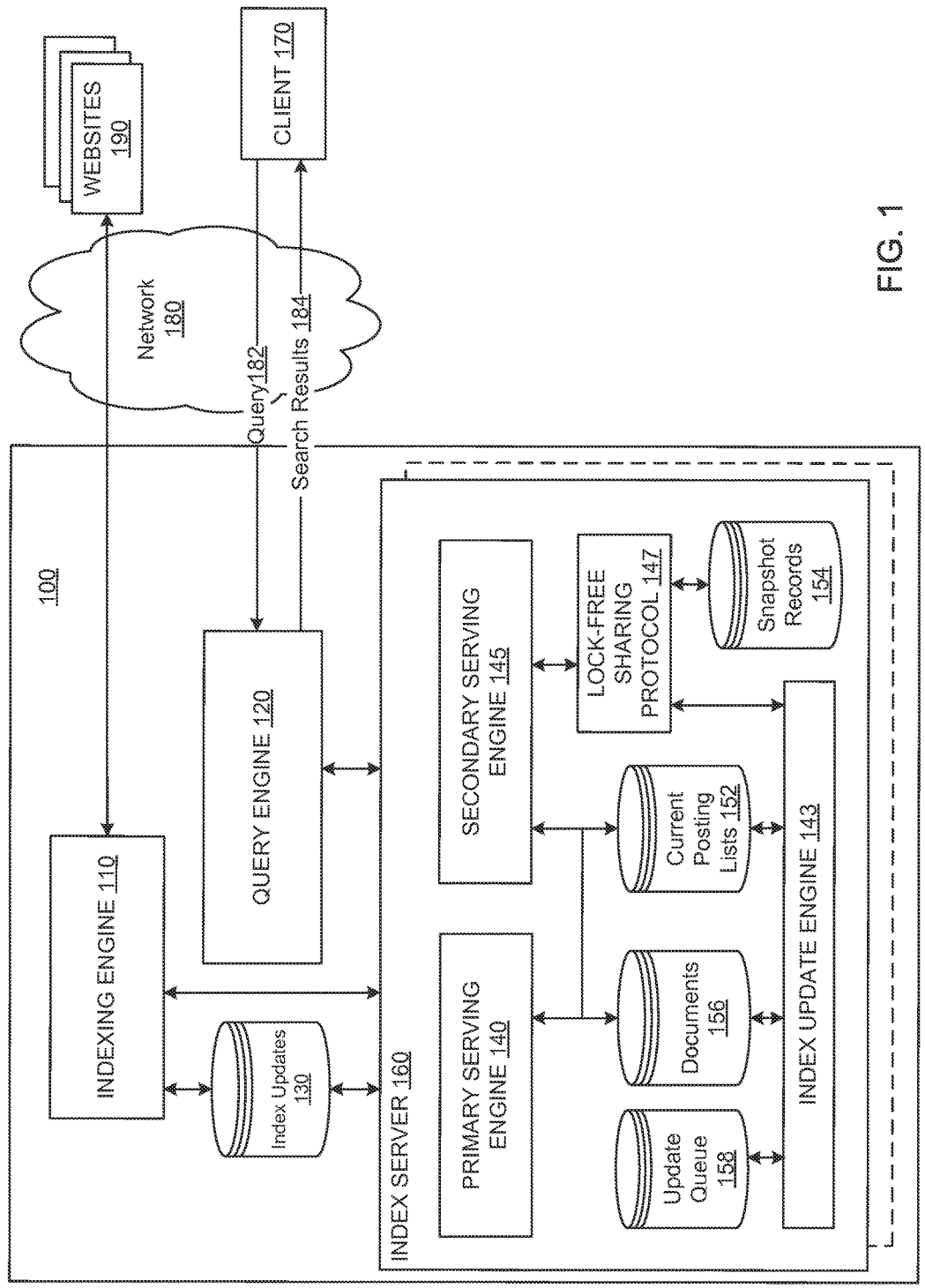
FIG. 1 illustrates an example system in accordance with the disclosed subject matter.
Figure 10:
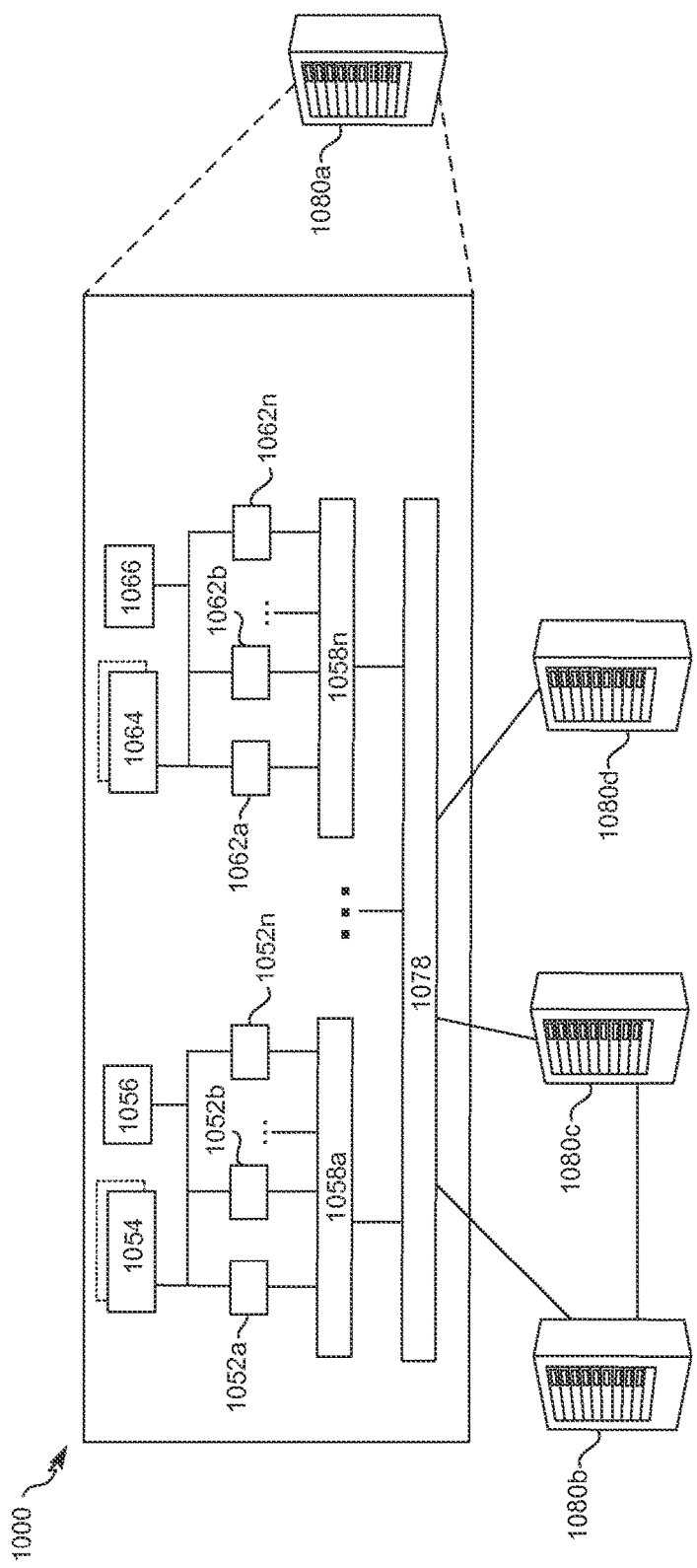
FIG. 10 shows an example of a distributed computer device that can be used to implement the described techniques.

FIG. 1 is a block diagram of a distributed indexing system 100 in accordance with an example implementation. The system 100 may be used to implement a distributed index and search system using the techniques described herein. The depiction of system 100 in FIG. 1 is described as an Internet-based search engine with an inverted index having, by way of example, terms as key-values and lists of document identifiers as non-key values, but the techniques described may be applied to other types of inverted indices. Documents may include any type of files with content, including web pages, PDF documents, word-processing documents, images, sound files, JavaScript files, etc. Other network configurations and applications of the described technology may be used. For example, the search engine may be used to search local documents, content stored on portable devices, or documents available through other technologies. The search system 100 may receive queries 182 from a client device 170 and return search results 184 in response to the queries. Each query 182 is a request for information from the search system 100. Query 182 can include, for example, text, audio, images, or scroll commands. The search system 100 may include indexing engine 110, query engine 120, and index server 160. Indexing engine 110, query engine 120, and index server 160 may be computing devices that take the form of a number of different devices, for example a standard server, a group of such servers, or a rack server system. In some implementations, indexing engine 110, query engine 120, and index server 160 may be a single system sharing components such as processors and memories. In addition, indexing engine 110 and query engine 120 may be implemented in a personal computer, for example a laptop computer. In some implementations, the indexing engine 110, the query engine 120, and the index server 160 may be distributed systems implemented in a series of computing devices, such as a group of servers. In some implementations, the servers may be organized into a tree structure, with a root server and leaf servers. In such implementations query engine 120 may be the root and a plurality of index servers 160 may be the leaves. In some implementations, the tree may include intermediate servers, so that there are one or more layers between the root and the leaf servers. The indexing engine 110, the query engine 120, and index server 160, may be examples of computer device 1000, as depicted in FIG. 10.

The search system 100 illustrated in FIG. 1 operates over a large corpus of documents, such as the Internet, but can likewise be used in more limited collections, such as a library of a private enterprise. In either context, documents are typically distributed across many different computer systems, servers, and sites, for example websites 190. Indexing engine 110 can crawl the contents, for example documents, of the web servers to locate newly added content, deleted content, and modified content. Added content, deleted content, and modified content are considered updates or updated content. When indexing engine 110 identifies updated content, it may send the update, such as update file 130, to the index server 160 and the index server may apply the update to the current posting lists 152. In a distributed index, updates from the indexing engine 110 may be distributed amongst one or more index servers 160. Each index server 160 may include an index update engine 143 that receives the update from the indexing engine 110 and updates the current posting lists 152 on the index server 160. Index update file 130 may be a single file or may be multiple files, with each file including content directed to a specific index server 160.

Indexing engine 110 can include one or more processors configured to execute one or more machine executable instructions or pieces of software, firmware, or a combination thereof to create index update file 130. For example, the indexing engine 110 may receive information from websites 190 regarding new, updated, and deleted documents. In a distributed environment, the indexing engine 110 may assign documents obtained from websites 190 to an index server 160. Websites 190 may be any type of computing device accessible over the Internet. In some implementations the indexing engine 110 may generate one index update file 130 per index server 160, so that each index server 160 receives an update file for the documents assigned to it. In some implementations the indexing engine 110 may generate one index update file 130. In some implementations, the index update file 130 may also include scoring information for the updated documents as well as other information, such as sort keys and attachment data, etc. In other words, the index update file 130 may include any data or information needed to update a given document and affected posting lists 152 on a given index server 160, whether deleted, inserted, or updated. Although not shown in FIG. 1 for the sake of brevity, in some implementations, the indexing engine 110 may include one or more separate computing devices.

Like the indexing engine 110, the query engine 120 may include one or more servers that work with the index server 160 to identify search results 184 for queries 182, for example, using conventional or other information retrieval techniques. In some implementations, query engine 120 may also be a root of a distributed index and may include one or more servers that receive queries 182 from a requester, such as client 170. The query engine 120 may work with the index server 160 to identify documents responsive to the query, and provide information from the responsive documents as search results 184 to the requester. The query engine 120 may include a ranking engine that calculates scores for the documents responsive to the query, for example, using one or more ranking signals. The ranking engine may rank the documents found responsive to the query using the scores.

System 100 may also include an index server 160. Index server 160 may be a collection of distributed computing devices each with its own processor and memory. The number of computing devices that comprise index server 160 can vary. For example, the index server 160 may correspond to one computing device, or the index server 160 may be a logical computing device and may share physical computing resources, such as processors and memory, with other index servers 160. The query engine 120 may route query requests to the index server 160 and act as the primary means of communication between two or more index servers 160 at query serving time. In some implementations, the system 100 may include one or more layers of nodes, or intermediate nodes, between the query engine 120 and the index servers 160, but are not shown in FIG. 1 for the sake of brevity. Thus, for example, an intermediate node may be associated with, for example, 20 index servers 160. The intermediate node may be connected directly to the query engine 120, or there may be one or more additional layers between the intermediate node and the query engine 120. Thus, although FIG. 1 shows communications directly between the query engine 120 and the index server 160, it is to be understood that intermediate node(s) may be used to direct communications and aggregate results using known methods, such as remote procedure calls. In some implementations, the query engine 120, intermediate nodes, and index servers 160 may, collectively, be referred to as the index. In some implementations the current posting lists 152 may be referred to as the index.

An index server 160 can include current posting lists 152. The current posting lists 152 may be stored in memory configured to store one or more pieces of data, either temporarily, permanently, semi-permanently, or a combination thereof. The memory may include any type of storage device that stores information in a format that can be read and/or executed by a processor, including volatile memory, non-volatile memory, or a combination thereof. Current posting lists 152 may be an inverted index that associates key values to a list or set of non-key values. For example, a posting list may associate a term with a list of documents that include the term. As another example, a posting list may associate a property with a list of documents that include the property. The posting lists 152 may be stored in fast-access memory, such as RAM, flash, cache, etc., to minimize query latency, or may be stored, e.g., on disk. Terms may be single words, n-grams, multiple word phrases, or other word patterns. Likewise, a property of a document, such as "is_English" or "is_French" can be a term and have a posting list that includes documents having the property. Posting lists 152 may support in-place updates, or instant updates. An in-place update or instant update refers to an update that does not take place in a batched manner. In other words, an instant update occurs close in time to the discovery of the updated document by the indexing engine 110, rather than at a pre-scheduled time, for example, once or twice a day. A posting list for a particular term can include a large number of associated documents, for example more than one hundred thousand documents.

The index server 160 may also include documents 156. In some implementations, documents 156 may also include document meta-data and other information. The documents 156 may be processed, encoded, and scored information for documents retrieved from websites 190, rather than a copy of the actual documents from the websites 190. Current posting lists 152 may generally represent terms appearing in the documents 156. In some implementations, documents 156 may include different versions of a document, so that when a document is updated, the new version of the document is added to documents 156 rather than replacing an existing version of the document.

The index server 160 may also include snapshot records 154. Snapshot records 154 represent information that secondary serving engine 145 can apply to current posting lists 152 to rebuild an older version of the current posting lists 152. For example, when the secondary serving engine 145 accesses a posting list from the current posting lists 152, it may check the snapshot records 154 to see if the posting list has one or more corresponding snapshot records 154 that are within a predetermined window, for example within the last 5 minutes. If the posting list has at least one corresponding snapshot record 154, the secondary serving engine 145 may obtain the oldest snapshot record 154 within the 5 minute window and overlay the bytes of the current posting list 152 with the bytes from the selected snapshot record 154. This results in the secondary serving engine 145 using a version of the posting list that is five minutes old. The window may be a moving window that is determined based on the time the query is received. For example, to determine which snapshot records 154 are within the window, the secondary serving engine 145 may use a time when a query is received and use snapshot records with a timestamp that fall within the query time and the predetermined window length, for example five minutes. A clean-up process may delete snapshot records 154 that are older than another predetermined time to keep the memory footprint of the snapshot records 154 at a minimum. For example, if the predetermined window is five minutes, the clean-up process may expire any snapshot records older than five minutes, five minutes one second, etc. If one or more recent updates to current posting lists 152 include corrupt data that has caused the primary serving engine 140 to crash, the secondary serving engine 145 will not see these updates because the updates are overlaid by the snapshot records 154. Thus, the secondary serving engine 145 may continue to serve queries 183 using the older version of the index while the primary serving engine 140 is restored.

Primary serving engine 140 may work with query engine 120 to generate search results 184 using current posting lists 152 and documents 156. The primary serving engine 140 may not use snapshot records 154, so that the primary serving engine 140 uses the most current version of posting lists 152 and incurs no overhead on query serving performance. Secondary serving engine 145 may work with query engine 120 when the primary serving engine 140 is unavailable. The primary serving engine 140 may be unavailable because it has crashed, it is busy, it is unresponsive, or is for some other reason. The query engine 120 may determine the availability of primary serving engine 140, or the index server 160 may determine the availability of primary serving engine 140. If the primary serving engine 140 is unavailable, the secondary serving engine 145 may handle the query request. In some implementations the primary serving engine 140 and the secondary serving engine 145 may concurrently serve query requests. But even when concurrently serving query requests, the secondary serving engine 145 uses the snapshot records to generate an older version of the posting lists 152, while the primary serving engine 140 uses the unaltered posting lists 152.

The index server 160 may include index update engine 143. The index update engine 143 may receive index update file 130 and apply the updates to the current posting lists 152 and documents 156, generating snapshot records 154 in the process. In some implementations, the index update engine 143 may be run in the same process as the primary serving engine 140. If index update engine 143 is not run in the same process as the primary serving engine 140, the index server 160 may provide synchronization between the two processes. In some implementations, index update engine 143 may delay application of updates to the current posting lists 152 until generating appropriate snapshot records 154. For example, index update engine 143 may use update queue 158 to delay application of an update by placing the updated of a posting list into the update pending queue 158. Updates in the update pending queue 158 may wait a predetermined amount of time, such as 10 seconds, before being applied to current posting lists 152. While this introduces a slight delay into the index update, it ensures that snapshots records are in place for the secondary serving engine 145 to read before the posting list 152 itself is changed. This ensures that if the secondary serving engine 145 is reading a particular posting list while the index update engine 143 is processing an update to the particular posting list, the secondary serving engine 145 will not mistakenly use the updated posting list because a snapshot record 154 does not yet exist.

To facilitate the sharing of data in memory by reading processes and writing processes, in some implementations, the data structures in index server 160 may use a lock-free memory sharing structure. For example, the secondary serving engine 145 may be a reading process that reads the snapshot records 154 and the index update engine 143 may be a writing process that writes data to the snapshot records 154. While shared memory locks can be used to share memory between processes, shared memory locks can be difficult to recover after a crash. Accordingly, some shared memory, such as the snapshot records 154 and other data, such as flash buffer caches, offset maps, overflow regions, etc., may use a lock-free memory sharing structure. The lock-free memory sharing structure may support a single writer process and multiple reader processes for accessing the shared data without a shared memory lock.

For example, in some implementations, the snapshot records 154 may include a map portion and a data portion. The map portion may implement the lock-free memory sharing structure and include a state field, a key field, a value field, and a timestamp field. The state field may indicate whether a particular record in the snapshot records is valid, and if valid, whether a reading process is currently using the data portion. In some implementations, the state field may indicate the number of reading processes currently using the data portion. Some implementations may use a separate field for identifying record validity and the number of reading processes. In some implementations the timestamp may operate as an indication of whether the record is valid and whether a reading process is currently using the data portion. For example, the system may automatically evict snapshot records that are, for example, 10 or 20 seconds older than the length of the snapshot window. Because only queries processed by the secondary serving engine 145 read snapshot records, the secondary serving engine may automatically determine that snapshot records older than the snapshot window are not valid. Furthermore, because query processing generally lasts under a second, the extra 10-20 seconds ensures no query is using the snapshot record and it can safely be evicted after this time period.

The key field of the map portion may identify the record. In some implementations, the records may be divided into shards. Each shard may have a predetermined number of associated records. The size of the shard, or the number of records associated with a shard, may be kept relatively small so that a linear search for a record within a shard can be performed efficiently during a read operation. A record may be assigned to a shard using a hash function. Dividing the records into shards and assigning the record to a shard using a hash function provides an efficient way to find a particular record without having to maintain a separate index.

In some implementations the key field may be a record identifier, and in some implementations the key field may be a local record identifier that is based on the actual record identifier. In other words, a record may have a value in the key field that is unique within the shard, and which is based on the record identifier. For example, the key field may have a value that represents the record identifier divided by the number of shards in the snapshot records 154. The lock-free memory sharing structure may also include a value field that points to the data portion of a snapshot record. Thus, the map portion may point to the data portion of the snapshot record. The data portion of the snapshot record may be the physical memory that stores the information for the snapshot record. In some implementations the data portion for a snapshot record may include the byte offset for the bytes used in the overwrite operation.

Figure 2:
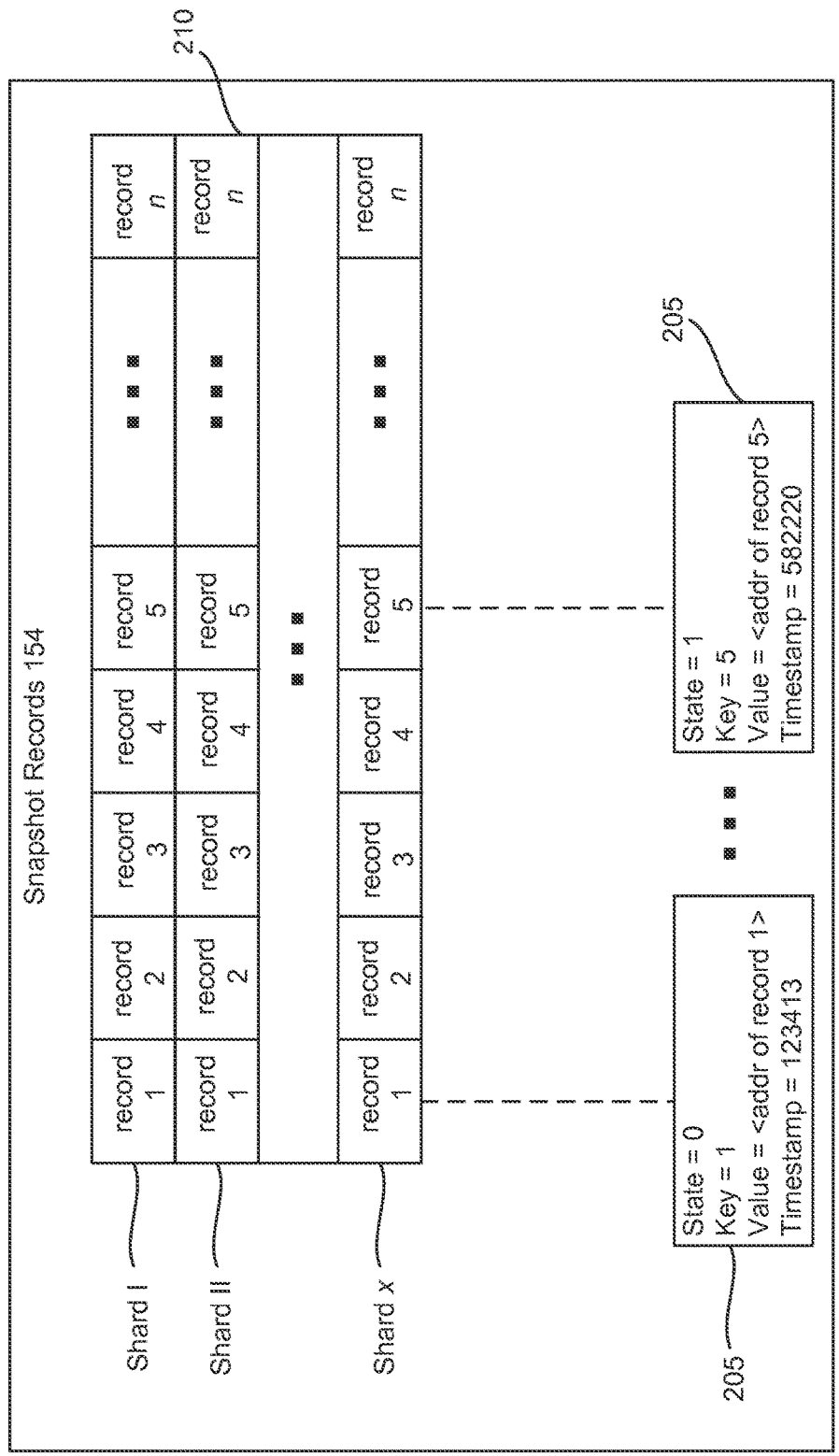
FIG. 2 illustrates an example of snapshot records that use a lock-free memory sharing structure.

FIG. 2 illustrates an example of snapshot records that use a lock-free memory sharing structure. In the example of FIG. 2, snapshot records 154 include a data portion 210 and a map portion 205. In the example of FIG. 2 the snapshot records 154 are divided into x shards and each shard includes n records. The records may be a fixed number of bytes, for example 128 bytes or 256 bytes, etc. A record stored in the snapshot records 154 may have an associated map portion 205 that is a lock-free memory sharing structure, which includes the state of the record, the record identifier, whether local or global, and the physical memory address for the data portion of the record. The state of the record may indicate whether the record has valid data, and if so, how many reader processes are currently reading the record, or have the record pinned. For example, the state may have a value of less than zero if the record is invalid, a status of zero if the record has valid data and no reading processes have the record pinned (i.e., are reading the data portion), and a state greater than zero if one or more readers have the valid record pinned. An invalid record may indicate that the record is ready for writing, but the data portion does not currently have valid data. A reading process may thus skip any invalid records. Accordingly, the writing process can write the data portion of a snapshot record and use a map portion with an invalid state to point to the data portion. Thus, the writing process may write the data portion first and then update the map portion of a snapshot record. In this manner the reading processes do not try to use the record until the writing process is finished writing. Furthermore, the writing process may use the state field to determine which records can be safely written to. Thus, the map portion 205 of FIG. 2 provides a lock-free memory sharing structure for sharing records between multiple reading processes and a single writing process. Although discussed above with regard to the snapshot records, it is understood that the lock-free memory sharing structure illustrated in FIG. 2 may be used to share any common memory locations, including flash buffer caches, offset maps, overflow regions, or event other types of shared memory records.

Indexing engine 110 may be in communication with websites 190 and query engine 120 may be in communication with client(s) 170 over network 180. Network 180 may be for example, the Internet or the network 180 can be a wired or wireless local area network (LAN), wide area network (WAN), etc., implemented using, for example, gateway devices, bridges, switches, and/or so forth. Via the network 180, the indexing engine 110 and the query engine 120 may communicate with and transmit data to/from websites 190 and clients 170.

Figure 3:
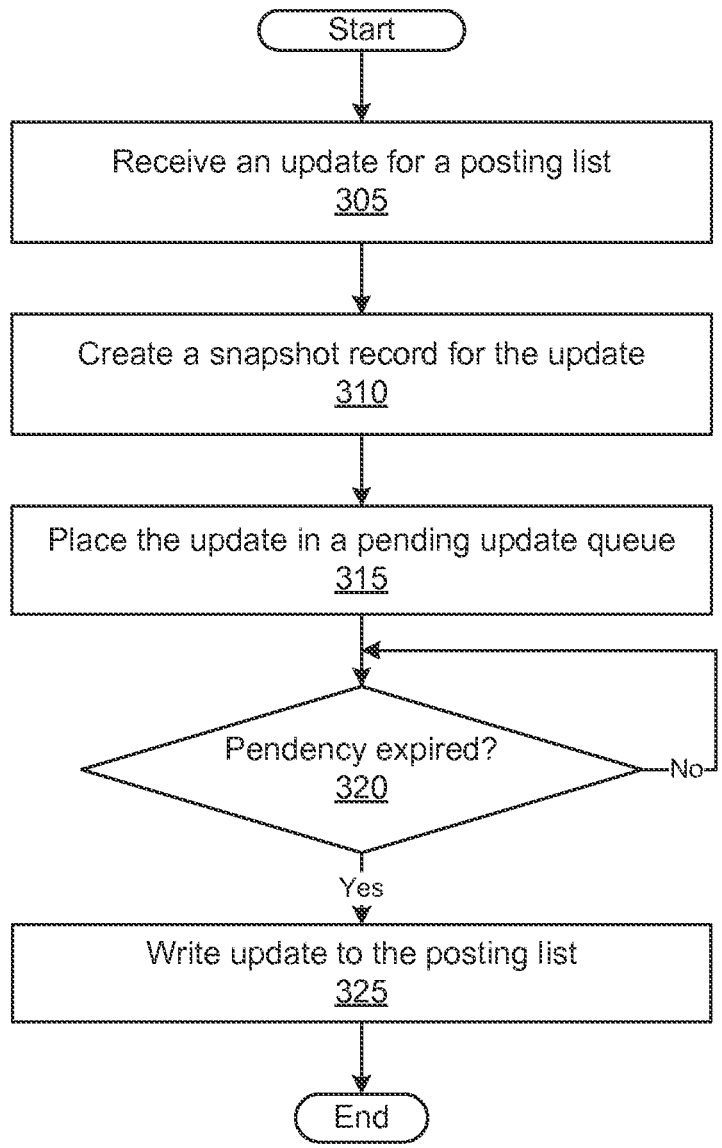
FIG. 3 illustrates an example flow diagram for creating a snapshot record during an in-place index update, according to an implementation.

FIG. 3 illustrates an example flow diagram of a process 300 for creating a snapshot record during an in-place index update, according to an implementation. The process 300 shown in FIG. 3 may be performed by a search system and, at least in part, by an index update engine, such as index update engine 143 shown in FIG. 1. Process 300 may begin when the index update engine receives an update for a posting list (305). The update may be part of a set of updates to multiple posting lists. For example, the update may be determined from index updates, such as index update file 130, sent to the index server from an indexing engine. In some implementations, the index update engine may determine which bits in the posting list are affected by the update. For example, the index server may determine that an update affects 10 bytes of a particular posting list starting at byte offset 150. A byte offset represents the number of bytes from the first byte of the particular data structure, for example the beginning of the particular posting list or the beginning of the document identifiers in the particular posting list.

Once the index update engine has determined which bytes are affected, the index update engine may create a snapshot record for the update (310). In some implementations, the snapshot record may include an indication of the bytes affected by the update and a byte offset. For example, if an update changes the 10 bytes starting at offset 150, the snapshot may include 150 as the byte offset and the 10 bytes of the current posting list that occur between offsets 150 and 159. Because the bytes are copied from the current posting list, the snapshot records contain bytes of the posting list prior to the update. For this reason, the snapshot records represent older versions of the posting list. The snapshot record may also include a timestamp. The timestamp may be used to determine whether the snapshot is too old or too new to be used by the secondary serving engine, as explained in more detail below.

In some implementations, the snapshot record may include more than the bytes changed, so that the number of bytes in the snapshot record is fixed in a memory-efficient manner, for example one or two CPU cache lines. This may require more storage for the snapshot records but offers efficiencies when reading the records and overlaying the posting list. For example, the index update engine may copy 128 bytes into the snapshot record, regardless of the number of bytes actually changed within the 128 bytes. In the example above, the index update engine may copy the bytes between offsets 128 and 255 to a snapshot record because the 10 bytes at offset 150 changed. In this example, the snapshot record may include 128 as the byte offset and the 128 bytes that fall between offsets 128 and 255. Of course the posting list may be much larger than the snapshot record. For example, some posting lists may be hundreds of thousands of bytes. After the index update engine generates the snapshot record with the unchanged bytes from the posting list, the index update engine may then proceed to update the posting list.

In some implementations the index update engine may place the update on an update pending queue (315). The update pending queue may hold the update for a predetermined amount of time. This allows the index update engine to avoid a situation where the index update engine applies an update to a posting list that the secondary serving engine is using to generate a search result for a query. For example, if when the secondary serving engine starts serving a query, the snapshot records may not include a record for a particular posting list. Thus, the secondary serving engine uses the current version of the particular posting list. However, if the index update engine changes the particular posting list before the secondary serving engine reads the particular posting list, the secondary serving engine is no longer using the older version of that posting list. To avoid this conflict, the predetermined amount of time may be based on an amount of time it takes the index server to process a query, so that the secondary serving engine can finish serving a query before the update is applied. For example, if the index server processes queries in under 10 seconds, the predetermined amount of time may be 10 seconds. Such a delay in updates may not be noticeable to a query requestor, but allows the index server to avoid the conflict described above.

The index server may check the pending update queue to determine when the pendency period has run (320). Once the pendency period is over (320), the index server may write the update to the posting list (325). For example, the index server may overwrite the bytes starting at the offset with the updated bytes. In some implementations, the updated bytes may be a memory efficient chunk, such as 128 bytes, regardless of the number of bytes that actually changed. Process 300 may then end, for the particular update. Of course, the index update engine may perform process 300 for several updates concurrently or serially, depending on the implementation.

FIG. 4 illustrates an example timeline for three updates to a posting list and the resulting snapshot records. In the example of FIG. 4, the posting list 152 for the term "cat" at time T1 represents an original posting list, before any of the three changes occurred. In the example of FIG. 4, the posting list for "cat" is separated into chunks 420, 422, 424, and 426. For the sake of brevity, only four document identifiers are illustrated in each chunk, but is understood that each chunk may include additional identifiers. Furthermore, although the chunks are illustrated as 128 bytes, the principles illustrated apply to any size chunk, and in some implementations the posting list is not divided into chunks. In such an implementation the snapshot record may include the actual starting byte offset for the replacement bytes that follow. In the example of FIG. 4, chunk 420 starts at offset 0, chunk 422 starts at offset 128, chunk 424 starts at offset 256, and chunk 426 starts at offset 484. For readability, the document identifiers in the chunks are shown as decimal numbers, not binary numbers, and commas to separate the identifiers. It is understood that the posting list may not be comma-delimited and that the document identifiers may be physically stored in binary form. It is also understood that the posting list may include additional chunks and document identifiers, which are not shown in FIG. 4 for the sake of brevity.

At time $T_2$, a first update occurred, which affected document identifiers in the chunk 420, chunk 424, and chunk 426. Specifically, the fourth document identifier in chunk 420 was changed from 4 to 5, the second document identifier in chunk 424 was changed from 20 to 19, and in chunk 426 the third and fourth document identifiers changed from 35 to 33 and 37 to 35 respectively. In response to the update the system created snapshot records for chunks 420, 424, and 426, all with a timestamp of $T_2$, the time of the update. As illustrated, the system may create three snapshot records, one for each chunk affected by the update and may contain the bytes from the chunk as they appeared prior to the update. In other words, the snapshot records 154 with timestamp $T_2$ represent the posting list as it appeared just before time T2. The posting list 152 illustrated at time T2 then replaces the posting list 152 illustrated at time T1. In other words, the bytes of the posting list of T1 are replaced, converting the posting list 152 at time T1 into the posting list 152 illustrated at time T2. In some implementations, the update may not occur until after a predetermined period after time T2.

At time T3, another update occurs. The update at time T3 affects chunk 420 and chunk 422. Thus, the system creates two snapshot records with a timestamp of T3; one for chunk 420 and one for chunk 422, as illustrated. The snapshot records represent the posting list 152 as it appeared just before time T3. The bytes of the posting list at time T2 are updated, as reflected by the posting list 152 at time T3. Thus, the posting list of time T2 is replaced by the posting list at time T3. As indicated above, the updating of the posting list may occur after a delay, so the posting list is not actually updated until a time after T3.

At time T4, another update occurs. The update at time T4 affects chunk 420 and chunk 424. Thus, the system generates two snapshot records with a timestamp of T4, one for each chunk affected by the update. The snapshot records 154 with timestamp T4 represent the posting list as it appeared just before time T4. The snapshot records illustrated in FIG. 4 may be created during process 300 and may be stored, for example, in snapshot records 154 of FIG. 1. The posting list at time T4 replaces the posting list at T3, and may be stored in current posting lists 152. Thus, while FIG. 4 illustrates four different posting lists 152 for ease of explanation, it is understood that only one version may be stored at any time. However, each of the snapshot records 154 illustrated in FIG. 4 may be stored concurrently.

Figure 5:
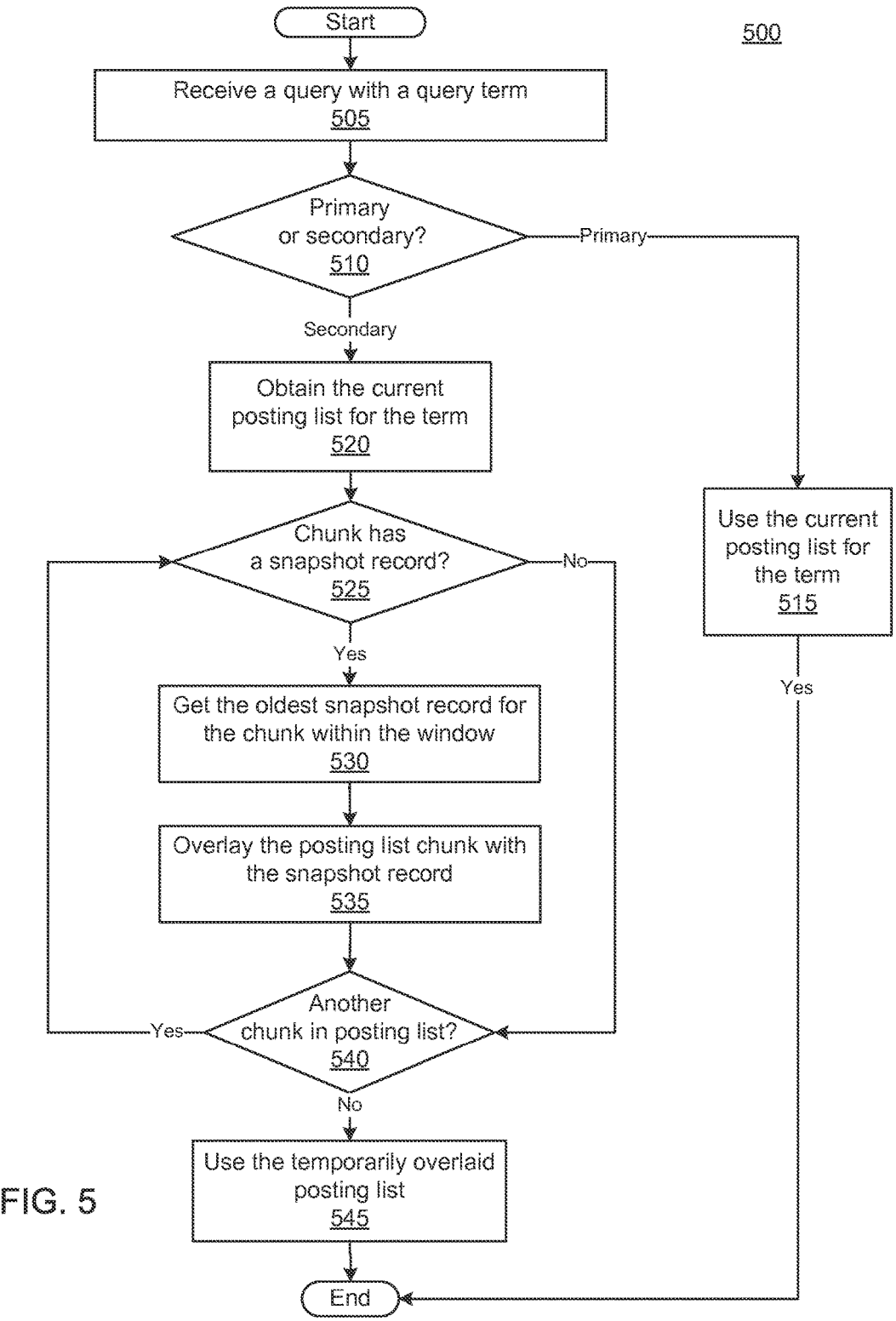
FIG. 5 illustrates an example flow diagram of a process for query serving using a primary serving engine and a secondary serving engine, according to an implementation.

FIG. 5 illustrates an example flow diagram of a process 500 for query serving using a primary serving engine and a secondary serving engine, according to an implementation. Process 500 may be performed at least partially by a query engine and an index server of a search system, for example the query engine 120 and index server 160 of FIG. 1. Process 500 may begin when the search system receives a query that includes at least one query term (505). The search system may determine whether a primary serving engine or a secondary serving engine will handle the query (510). This decision may be made, for example at the query engine or at the index server. If the primary serving engine is available (510, Primary), the search system may employ the primary serving engine, which uses the current posting list for the term (515). For example, the primary serving engine may use current posting lists 152 without regard to any snapshot records 154. The current posting lists 152 may reflect the instant or near-instant updates that have been applied by an index update engine. Because the primary serving engine can use the current posting list the primary serving engine does not suffer a performance hit in providing fresh search results.

If the primary serving engine is not available (510, Secondary) the search system may serve the query using the secondary serving engine. In some implementations, the search system may use the secondary serving engine as a load balancer to relieve the primary serving engine. The search system may also use the secondary serving engine when the primary serving engine is unresponsive, has crashed, is presumed dead, etc. The secondary serving engine may obtain the current posting list for the term, for example from current posting lists 152 (520). The secondary serving engine may determine whether a snapshot record exists for a particular chunk, or portion, of the posting list (525). In some implementations, the secondary serving engine may have retrieved the snapshot records for the posting list prior to performing step 525. In some implementations the secondary serving engine may retrieve the snapshot records as part of step 525.

If the secondary serving engine determine that a particular chunk has at least one snapshot record (525, Yes), the secondary serving engine may select the oldest snapshot record for the chunk that is still within a predetermined window (530). For example, the secondary serving engine may search the snapshot records for records associated with the chunk that fall within a predetermined window. The window may represent a period sufficient to determine whether recent updates include bad data. For example, it may be determined that if the primary serving engine runs a predetermined number of queries after an update, the update is good. It may also be determined that the search system processes the predetermined number within five minutes. Thus, in some implementations, the length of the predetermined window may be based on the amount of time, e.g., five minutes, it takes the search system to process the predetermined number of queries. In such an implementation, the secondary serving engine may use the query receipt time and the timestamp associated with the snapshot record to determine whether the record falls within the window. In some implementations, the length of the predetermined window may be based on the search system receiving a predetermined number of queries. For example, the map portion of the snapshot record may include a field that records a query number at the time the snapshot record was generated. If a current query counter is less than or equal to the field plus the predetermined number of queries, the snapshot record is within the predetermined window.

If two or more snapshot records exist in the window for the chunk of the posting list, the secondary serving engine may select the oldest snapshot record that falls within the window. The window may be measured from the receipt of the query the secondary serving engine is processing. For example, using the snapshot records of FIG. 4, if the secondary serving engine receives a query at time T5, times T2-T4 fall within the window, and the query includes the term "cat", the secondary serving engine would select snapshot record 450 for chunk 420. But if only times T3 and T4 fall within the window, the secondary serving engine would select snapshot record 460 for chunk 420.

Once the secondary serving engine has obtained the snapshot records, the secondary serving engine may overlay the current posting list using the snapshot record (535). Since each snapshot record includes a starting byte offset, either expressly or by implication, the secondary serving engine may use the bytes from the snapshot record that start at the byte offset of the current posting list rather than the bytes that actually exist in the current posting list. By overlaying the bytes of the current posting list with the snapshot record, the secondary serving engine reverts any updates to the posing list that occurred at and after the time represented by the timestamp of the snapshot record. Thus, for example, if the secondary serving engine overlays chunk 420 at time $T_5$ with record 450, the updates that occurred at times $T_2$-$T_4$ are overwritten and the secondary serving process can use the older version of the posting list to process the query. The secondary serving process may repeat steps 525 to 535 for any remaining chunks in the posting list. In some implementations the secondary serving engine may know it only needs to access a few chunks of the posting list. Thus, if the secondary serving engine has checked for snapshot records for those chunks, it may be finished (540, No). When the secondary serving engine has overlaid the current posting list with all relevant snapshot records (540, No), the secondary serving engine may use the overlaid posting list to process the query (545). It will be understood that the posting list used by the secondary serving engine is a prior version of the current posting list generated using the snapshot records. Process 500 may end, with the secondary serving engine using the prior version of the posting list to generate search results for the query.

If the main query serving process has crashed, the snapshot records may also be used to restore the index. For example, the index update engine or some other recovery engine may select the snapshot records in the predetermined window, as discussed above with regard to steps 520 to 540 and use the records to write over the current posting list data. Thus, instead of using a temporary overlaid posting list (545), the recovery engine may permanently overwrite the current posting list data. In this manner the current posting lists, which include corrupted data, may be reverted to an older, clean version using the snapshot data. The window for the recovery process may differ in size from the window used by the secondary serving engine, or it may be the same size. Thus, it is understood that a process similar to process 500 may be used to recover the index and the primary serving engine.

Figure 6:
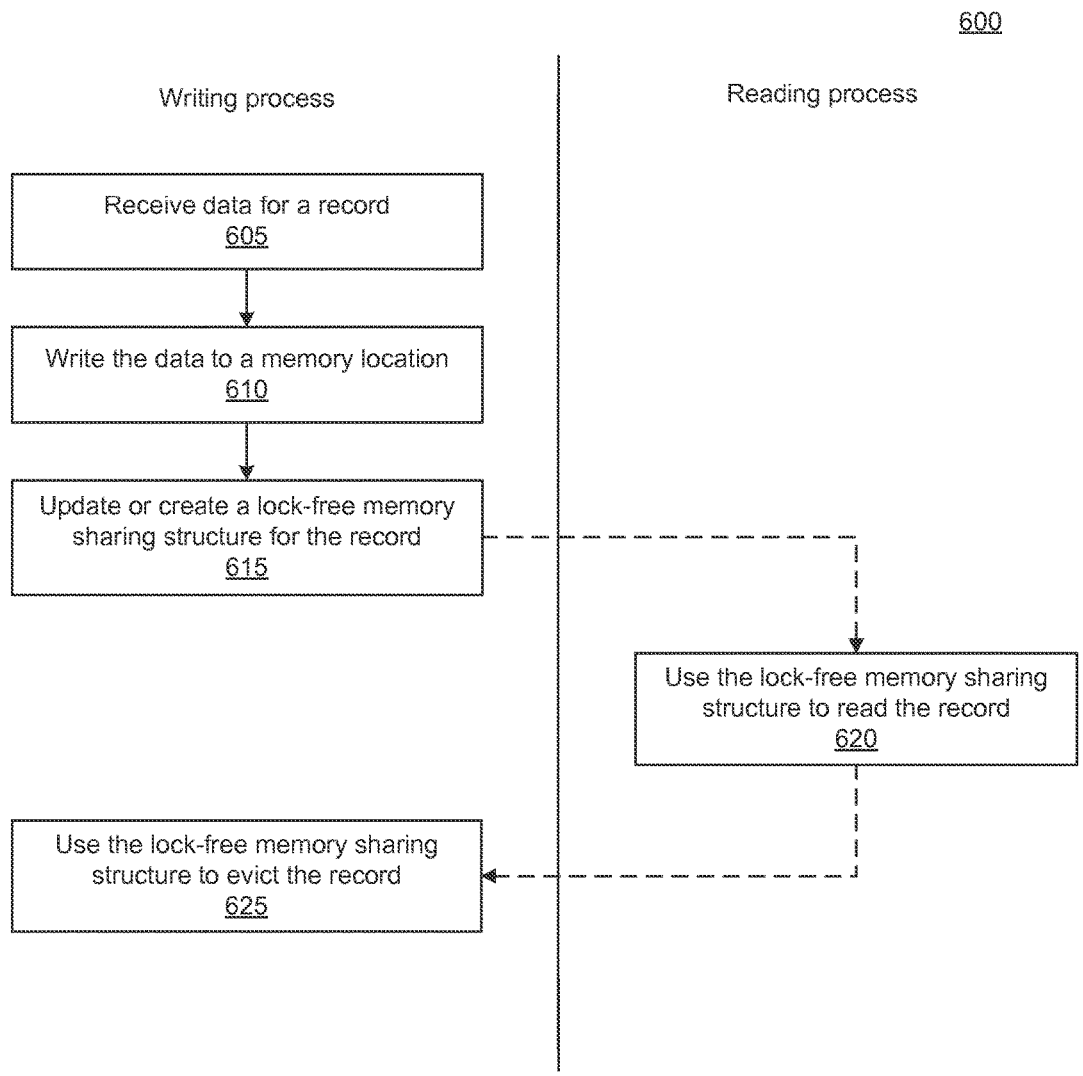
FIG. 6 illustrates an example flow diagram of a process using a lock-free memory sharing structure, according to an implementation.

FIG. 6 illustrates an example flow diagram of a process 600 using a lock-free memory sharing structure, according to an implementation. Process 600 may be performed by two or more processes, with one process being a writing process and the other processes being reading processes. For example, process 600 may be used by an index update engine to insert snapshot records and a secondary serving engine that reads the snapshot records. Process 600 may begin with the writing process receiving data to write a new record to the shared memory store (605). In one implementation, the data is data for a new snapshot record. The writing process may proceed to write the data to the shared memory store (610). Writing the data to the shared memory store may provide the writing process with a physical address of the data. The writing process may then update or create a lock-free memory sharing structure for the record (615). This may include finding an existing structure to update and setting a state value that indicates that the data is available for reading, as explained in more detail below with regard to FIG. 7. In some implementations, the lock-free memory sharing structure may include a pointer to the address of the data as determined in step 610. After the lock-free memory sharing structure has been updated, the record may be available for reading by one or more reader processes (620). The reading process may read the data at some later time, as represented by the dashed line between step 615 and 620. Furthermore, several reading processes may read the record concurrently. Reading a record is explained in more detail below with regard to FIG. 8. At some later point in time, the writing process may expire the record (625). For example, if the record is a snapshot record and the timestamp for the snapshot record is older than a predetermined time, the writing process may locate the lock-free memory sharing structure for the record, wait for the state field to indicate no reading processes are reading the record (e.g. the state is zero), and then update the state field to indicate the record is invalid, for example by setting the state to a negative number. In some implementations the negative number is negative high values, or negative infinity. Checking whether the state is valid and marking the state as invalid are done atomically via a single hardware instruction. In some implementations eviction may be implicit. For example, the reading process may consider any snapshot records older than the predetermined snapshot window at the query time to be invalid. An invalid record may be recycled in step 615 to point to a different record at a later point in time, as described in more detail with regard to FIG. 7.

Figure 7:
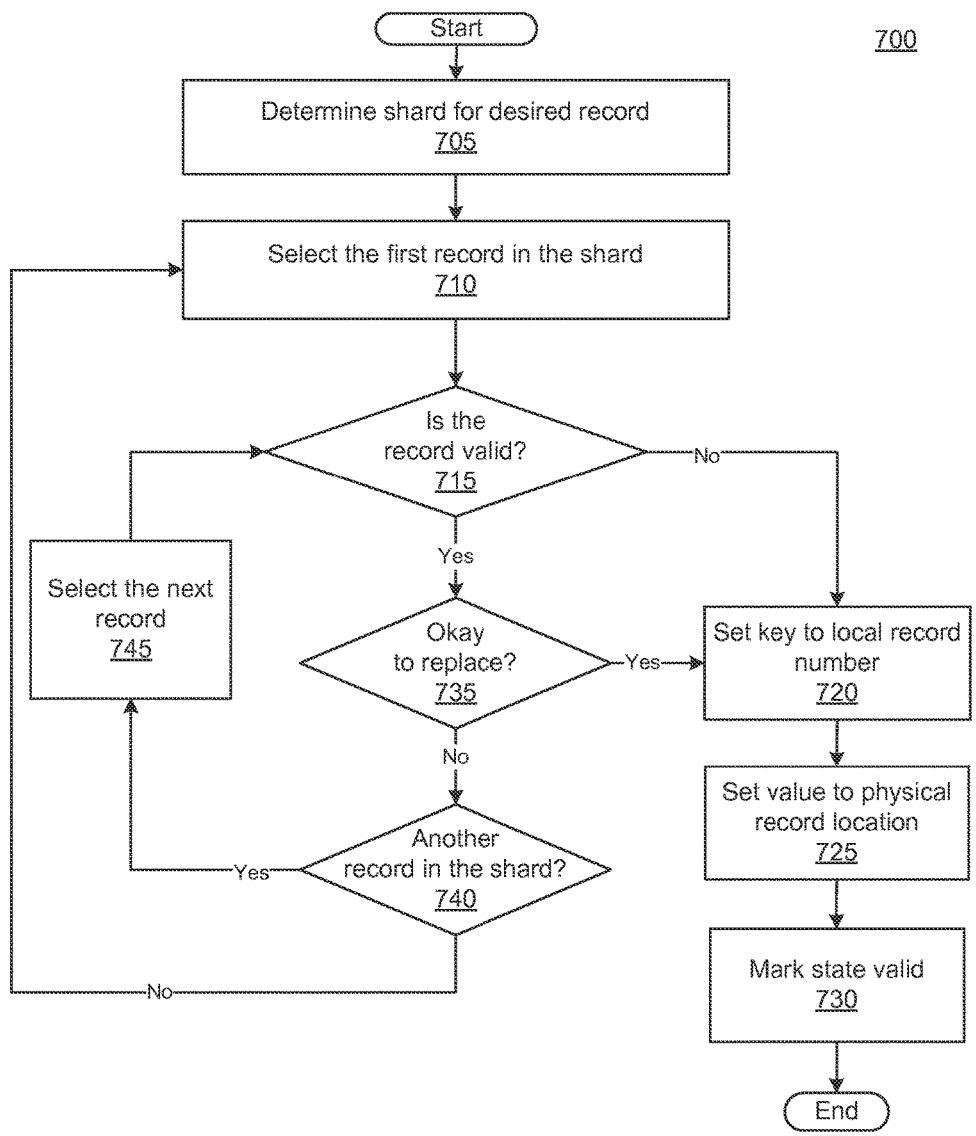
FIG. 7 illustrates an example flow diagram of a process for writing to a record that uses a lock-free memory sharing structure, according to an implementation.

FIG. 7 illustrates a write process 700 that uses the lock-free memory sharing structure. Process 700 may be used by the index update engine to insert snapshot records. The index update engine may write the data portion of the snapshot record to a memory location, and then begin process 700 to update the entries of the lock-free memory sharing structure used in the map portion of the snapshot record. In some implementations, process 700 may be performed as part of step 615 of FIG. 6. Although discussed below with regard to an index update engine updating snapshot records, it is understood that the principles can be applied to other types of records, such as cache records or offset tables, that are shared between two processes. In some implementations, process 700 receives two parameters—a record number and a pointer to the address in memory where the data portion is stored. In some implementations, the record number may represent a record identifier, such as a sequentially assigned or a calculated identifier for the record.

Process 700 may begin by determining the shard assignment for the record number that was provided by the index update engine (705). As discussed above, the snapshot records may be divided amongst various shards. If the records are not divided amongst shards, step 705 is optional and may not be performed. Dividing the records among shards ensures that there are not too many records to inspect in the linear search for the records but keeps the insert process simple because a separate index is not needed. The system may perform a search of the records within the assigned shard, looking for a record that is already invalid or ready for expiration. The lock-free memory sharing structure includes fields that speed the search. The system may begin with the first record in the shard (710) and determine whether the record is valid (715). For example, the map portion of the snapshot records, such as map portion 205 of FIG. 2, may be a lock-free memory sharing structure that includes a state field that provides an indication of whether the record is valid. In some implementations, if a timestamp in the lock-free memory sharing structure indicates that the record is older than the length of the predetermined snapshot window plus another small buffer of time, for example 10-20 seconds, the record may not be valid. If the record is not valid (715, No), the system has found an entry that can be used to insert a new record. To insert the record, the system may set the key field in the lock-free memory sharing structure to the record number provided as the parameter (720). In some implementations, the system may set the key to a local record number that is generated based on the record number provided as the parameter. For example, the local record number may be generated by dividing the record number by the number of shards. The system may then set the value field of the lock-free memory sharing structure to the address of the data portion, which was provided as a parameter to process 700 (725). With the lock-free memory sharing structure in place, the snapshot record is ready to be read by a reading process. Thus, the system may set the state field to zero, indicating that the record contains valid data and currently has no reading processes (730). In other implementations the system may set the timestamp to the current time. Process 700 then ends for this record, and the new record can be read by reading processes.

If the record is valid (715, Yes), the system may determine whether the record is due for replacement (735). For example, the record may be too old to be used by any reading processes and can safely be replaced or expired. If the record is too old and the state indicates that no reading processes have the record pinned, the record may be okay to replace (735, Yes). If so, the system map perform steps 720 to 730 as described above and process 700 may end. In implementations that use the timestamp to determine whether the record is valid, step 735 is optional. If the record is not okay to replace (735, No), the system may determine if there is another record in the shard (740). If all records have been inspected (740, No), the system may begin again at the first record (710) because additional time has passed and a record may now be available to replace. If the record is not the last record (740, Yes), the system may select the next record (745) and begin at step 715 to determine if the next record can be used to insert the new data. Thus, process 700 allows a writing process to update records in the snapshot while reading processes access the records without having to use a memory lock.

Figure 8:
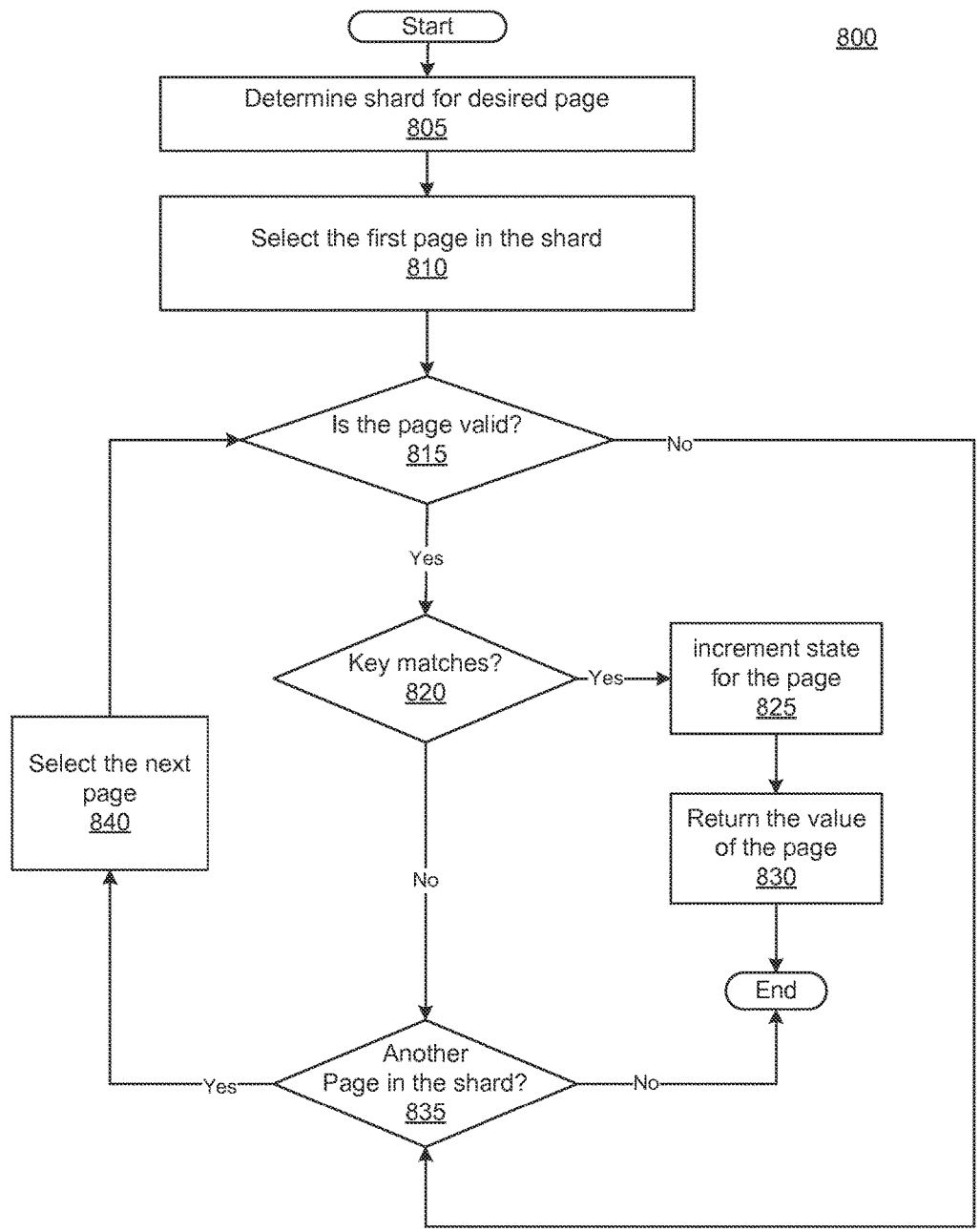
FIG. 8 illustrates an example flow diagram of a process for reading from a record that uses a lock-free memory sharing structure, according to an implementation.

FIG. 8 illustrates a process 800 for reading shared data that uses a lock-free memory sharing structure. Process 800 may be used by the secondary serving engine to access the snapshot records as part of process 500. Process 800 may also be used by the primary and secondary serving engines to access a flash write buffer or any other shared memory space as part of step 620 of FIG. 6. The lock-free memory sharing structure may allow several processes to read data at once, but may allow only one process to write to the shared memory at a time. The processes 800 may begin by determining the shard a desired record is located in (805). For example the system may assign records to shards using a modulus function, so that records are evenly distributed amongst the shards. Thus if the snapshot records are divided into 10 shards, every $1^{st}$, $11^{th}$, etc., record may be assigned to the first shard, every $2^{nd}$, $12^{th}$, etc., record may be assigned to the second shard, etc. In some implementations the shard assignment may be determined using a modulus operation on the record identifier. In some implementations if the records are not sharded, step 805 may be optional.

The system may then begin a linear search for the desired record within the shard. Accordingly, the system starts with a first record (810) and determines whether that record is valid (815). For example, the snapshot record may have a state field in a map portion that indicates the snapshot record is valid, or a snapshot record with a timestamp within the snapshot window may be considered valid. If the record is valid (815, Yes), the system determines whether the key matches the desired record (820). For example, the system may provide a parameter to process 800 that represents the record number, and the system may inspect the key field of the lock-free memory sharing structure to determine if it matches the parameter. In some implementations, the key may be a local record identifier that is local to the shard. This allows the key field of the lock-free memory sharing structure to be smaller than the actual record identifier. The local record identifier may be based on the requested record identifier. For example, the local record identifier may represent the result of dividing the requested record identifier by the number of shards. In such implementations, the system may divide the provided record identifier by the number of shards before attempting to match the key field. Other methods of identifying the requested record within a shard may be used. If the key field matches (820, Yes), the system may increment the state field, if one exists, of the lock-free memory sharing structure for the record (825). The state variable provides an indication of the number of read processes that are using the record. If the state indicates one or more read processes are using the record, a write process knows that the record is not available for writing. The system may return the value field of the record (830). The value represents a pointer to the physical location of the memory storing the data portion of the record. Process 800 then ends. When the process reading the record, for example the secondary serving engine that initiated the read process 800, is finished reading the record data, the process may decrement the state field for the record.

If the record is not valid (815, No), the read process may move to the next record (835), if one exists. If one does exist (835, Yes), the next record is selected (840) and the system determines whether this record is valid and matches the parameter record identifier. The loop represented by steps 815, 820, 835, and 840 may be repeated until a matching record is found or no other records exist in the shard.

Figure 9:
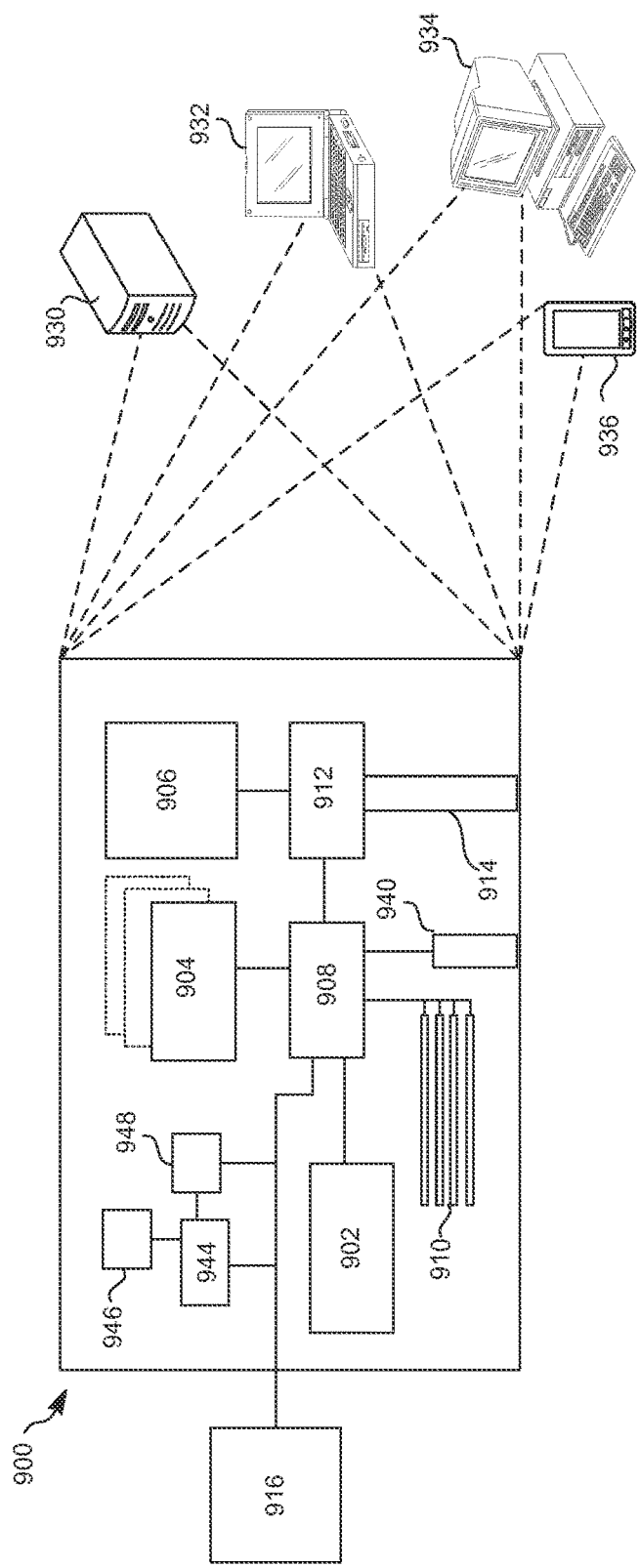
FIG. 9 shows an example of a computer device that can be used to implement the described techniques.

FIG. 9 shows an example of a generic computer device 900, which may be system 100, client 170, and/or a host of websites 190 of FIG. 1, which may be used with the techniques described here. Computing device 900 is intended to represent various example forms of computing devices, such as laptops, desktops, workstations, personal digital assistants, cellular telephones, smart phones, tablets, servers, and other computing devices, including wearable devices. The components shown in FIG. 9, their connections and relationships, and their functions, are meant to be exemplary only, and are not meant to limit implementations of the inventions described and/or claimed in this document.

Computing device 900 includes a processor 902, memory 904, a storage device 906, and expansion ports 910 connected via an interface 908. In some implementations, computing device 900 may include transceiver 946, communication interface 944, and a GPS (Global Positioning System) receiver module 948, among other components, connected via interface 908. Device 900 may communicate wirelessly through communication interface 944, which may include digital signal processing circuitry where necessary. Each of the components 902, 904, 906, 908, 910, 940, 944, 946, and 948 may be mounted on a common motherboard or in other manners as appropriate.

The processor 902 can process instructions for execution within the computing device 900, including instructions stored in the memory 904 or on the storage device 906 to display graphical information for a GUI on an external input/output device, such as display 916. Display 916 may be a monitor or a flat touchscreen display. In some implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk. In some implementations, the memory 904 may include expansion memory provided through an expansion interface.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also contain instructions that, when executed, perform one or more methods, such as those described above. The computer- or machine-readable medium is a storage device such as the memory 904, the storage device 906, or memory on processor 902.

The interface 908 may be a high speed controller that manages bandwidth-intensive operations for the computing device 900 or a low speed controller that manages lower bandwidth-intensive operations, or a combination of such controllers. An external interface 940 may be provided so as to enable near area communication of device 900 with other devices. In some implementations, controller 908 may be coupled to storage device 906 and expansion port 914. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 930, or multiple times in a group of such servers. It may also be implemented as part of a rack server system. In addition, it may be implemented in a personal computer such as a laptop computer 922, or smart phone 936. An entire system may be made up of multiple computing devices 900 communicating with each other. Other configurations are possible.

FIG. 10 shows an example of a generic computer device 1000, which may be system 100 of FIG. 1, which may be used with the techniques described here. Computing device 1000 is intended to represent various example forms of large-scale data processing devices, such as servers, blade servers, datacenters, mainframes, and other large-scale computing devices. Computing device 1000 may be a distributed system having multiple processors, possibly including network attached storage nodes, that are interconnected by one or more communication networks. The components shown here, their connections and relationships, and their functions, are meant to be exemplary only, and are not meant to limit implementations of the inventions described and/or claimed in this document.

Distributed computing system 1000 may include any number of computing devices 1080. Computing devices 1080 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 1080a includes multiple racks 1058a-1058n. Each rack may include one or more processors, such as processors 1052a-1052n and 1062a-1062n. The processors may include data processors, network attached storage devices, and other computer controlled devices. In some implementations, one processor may operate as a master processor and control the scheduling and data distribution tasks. Processors may be interconnected through one or more rack switches 1058, and one or more racks may be connected through switch 1078. Switch 1078 may handle communications between multiple connected computing devices 1000.

Each rack may include memory, such as memory 1054 and memory 1064, and storage, such as 1056 and 1066. Storage 1056 and 1066 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 1056 or 1066 may be shared between multiple processors, multiple racks, or multiple computing devices and may include a computer-readable medium storing instructions executable by one or more of the processors. Memory 1054 and 1064 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 1054 may also be shared between processors 1052a-1052n. Data structures, such as an index, may be stored, for example, across storage 1056 and memory 1054. Computing device 1000 may include other components not shown, such as controllers, buses, input/output devices, communications modules, etc.

An entire system, such as system 100, may be made up of multiple computing devices 1000 communicating with each other. For example, device 1080a may communicate with devices 1080b, 1080c, and 1080d, and these may collectively be known as system 100. As another example, system 100 of FIG. 1 may include one or more computing devices 1000 as indexing engine 110, a separate computing device 1000 as query engine 120, and one or more computing devices 1000 as index server 160. Furthermore, some of the computing devices may be located geographically close to each other, and others may be located geographically distant. The layout of system 1000 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system comprising:
   memory storing an index of documents, the index comprising at least one posting list that maps a term to documents;
   at least one processor; and
   memory storing instructions that, when executed by the at least one processor cause the system to:
   receive an update for the posting list,
   responsive to receiving the update:
      generate a snapshot record, the snapshot record including a portion of the posting list that is to be changed by the update, the snapshot record being smaller than the entire posting list, and
      modify the portion of the posting list using the update,
   use a main query processing engine to generate a search result for a subsequent query based on the updated posting list without applying the snapshot record, and responsive to determining that the main query processing engine is unavailable, use a secondary query processing engine to generate a search result for a subsequent query by applying the snapshot record to the updated posting list.

2. The system of claim 1, wherein the system further includes memory storing instructions that, when executed by the at least one processor, cause the system to:
delay updating the posting list for a predetermined amount of time.

3. The system of claim 2, wherein delaying includes:
placing the update in an update pending queue; and
modifying the portion of the posting list when the predetermined amount of time has elapsed.

4. The system of claim 1, wherein the portion fits within a cache line of the processor.

5. The system of claim 1, wherein the snapshot record includes an associated timestamp.

6. The system of claim 1, wherein the secondary query processing engine overlays the portion of the posting list with the snapshot record.

7. The system of claim 5, wherein the secondary query processing engine overlays the portion of the posting list with the snapshot record when the timestamp of the snapshot record indicates the snapshot is an oldest snapshot record for the portion within a predetermined amount of time.

8. The system of claim 1, wherein the system further includes memory storing instructions that, when executed by the at least one processor, further cause the system to restore the main query processing engine by overlaying the portion of the posting list with the snapshot record.

9. The system of claim 5, wherein the update is a first update and wherein the system further includes memory storing instructions that, when executed by the at least one processor, cause the system to:
receive a second update for the posting list, the second update including a second update to the portion of the posting list;
generate a second snapshot record, the second snapshot record including the portion that was modified by the first update; and
update the posting list with the second update.

10. The system of claim 1, wherein the update is a first update and the portion is a first portion and wherein the system further has memory storing instructions that, when executed by the at least one processor, cause the system to:
receive a second update for the posting list, the second update including a change to a second portion of the posting list and a change to the first portion of the posting list;
generate a second snapshot record, the second snapshot record including the portion that was modified by the first update;
generate a third snapshot record, the third snapshot record including the second portion of the posting list that is to be changed by the second update, wherein the second snapshot record and the third snapshot record have a same associated timestamp; and
modify the second portion of the posting list with the second update.

11. The system of claim 1, wherein the snapshot record uses a lock-free memory sharing structure.

12. The system of claim 11, wherein the lock-free memory sharing structure includes a state field that indicates whether the snapshot record is invalid, valid and pinned, or valid and not pinned.

13. A computer-implemented method comprising:
receiving, by a processor, a query;
determining that a main query processing engine is not responding; and
generating a search result for the query using a secondary query processing engine that applies at least one snapshot record to a portion of a posting list to rebuild an older version of the posting list, the snapshot record including the portion of the posting list as it appeared before a modification to the portion, the modification occurring within a predetermined time before receiving the query, the portion being a fixed size smaller than the posting list.

14. The method of claim 13, wherein the predetermined time represents a time elapsed in processing at least a predetermined number of queries.

15. The method of claim 13, wherein the at least one snapshot record is an oldest snapshot record selected from a plurality of snapshot records for the portion of the posting list, the plurality of snapshot records having timestamps within the predetermined time.

16. The method of claim 13, wherein applying the snapshot record includes overlaying the portion of the posting list with the snapshot record beginning at an offset specified by the snapshot record.

17. The method of claim 13, further comprising:
replacing the portion of the posting list with the snapshot record beginning at an offset specified by the snapshot record to recover the posting list; and
restarting the main query processing engine.

18. The method of claim 13, further comprising:
receiving an update for the posting list;
determining a second portion of the posting list affected by the update;
generating a new snapshot record for the second portion of the posting list, the new snapshot record including information in the second portion of the posting list; and
modifying the second portion of the posting list with the update.

19. The method of claim 18, further comprising:
placing the update in an update pending queue; and
modifying the second portion of the posting list when a second predetermined amount of time has elapsed.

20. The method of claim 13, wherein the main query processing engine generates search results without applying snapshot records.

21. The method of claim 13, wherein the snapshot record includes a lock-free memory sharing structure.

22. A system comprising:
memory storing an index of documents, the index including at least one posting list that maps a term to documents;
memory storing snapshot records, the snapshot records having at least one record that includes:
a map portion that includes a state field, and
a data portion that includes a portion of the at least one posting list as it existed prior to an update;
at least one processor; and
memory storing instructions that, when executed by the at least one processor cause the system to:
receive a query that includes the term;
determine that a main query processing engine is unavailable; and
generate a search result for the query using a secondary query processing engine that overlays a portion of the at least one posting list with the data portion of the at least one snapshot record so that the secondary query processing engine rebuilds an older version of the posting list.

23. The system of claim 22, wherein the system further includes memory storing instructions that, when executed by the at least one processor, cause the system to:
receive an update for the at least one posting list;
determine a second portion of the posting list affected by the update;
identify a second snapshot record with a state field that indicates the second snapshot record is invalid;
generate a new snapshot record for the second portion of the posting list by:
  writing information from the second portion of the posting list to memory storing a data portion of the new snapshot record,
  setting the state field of the second snapshot record to a value indicating the second snapshot record is valid, and
  associating the map portion of the second snapshot record with the data portion of the new snapshot record; and
modify the second portion of the at least one posting list using the update.

24. The system of claim 23, wherein the state field has a value less than zero to indicate the snapshot record is invalid, a value of zero to indicate that the snapshot record is valid, and a value greater than zero to indicate that the snapshot record is valid and in use by the secondary query processing engine.

25. The system of claim 23, wherein the data portion is of a fixed size.

26. The system of claim 23, wherein the state field is a timestamp field and when the timestamp field is within a predetermined window plus a buffer time the record is valid and when the timestamp field is outside the predetermined window plus the buffer time the record is invalid.

* * * * *